Sept. 21, 1948.　　　　C. A. DOMLER　　　2,449,884
STRAP

Filed May 4, 1946　　　　　　　　　3 Sheets-Sheet 1

INVENTOR.
Charles A. Domler
BY
Thomas A. Jenckes
Attorney

Sept. 21, 1948.   C. A. DOMLER   2,449,884
STRAP
Filed May 4, 1946   3 Sheets-Sheet 2

INVENTOR.
Charles A. Domler
BY Thomas A. Jenckes
Attorney

Sept. 21, 1948.  C. A. DOMLER  2,449,884
STRAP
Filed May 4, 1946  3 Sheets-Sheet 3
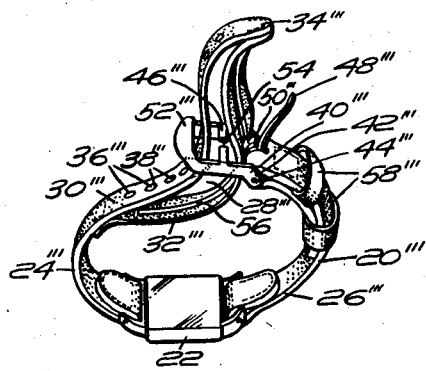
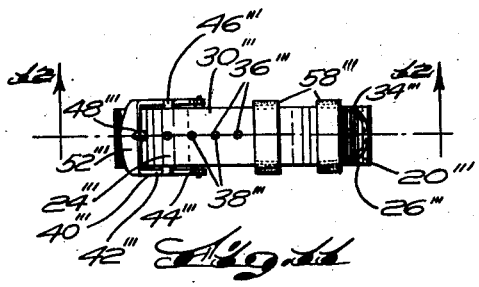
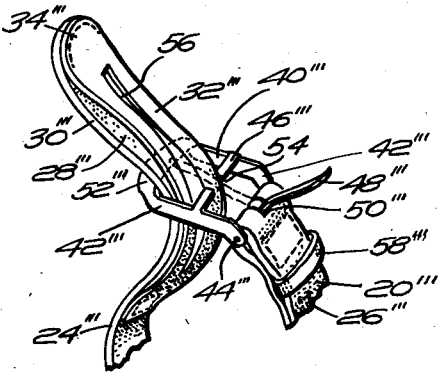
INVENTOR.
Charles A. Domler
BY
Thomas A. Jenkes
Attorney Patented Sept. 21, 1948

2,449,884

UNITED STATES PATENT OFFICE 2,449,884

STRAP

Charles A. Domler, Johnston, R. I.

Application May 4, 1946, Serial No. 667,311

13 Claims. (Cl. 224—4)

1

My invention relates to improvements in straps, particularly to the type in which the entire strap is continuously assembled in the position desired for use so that it may be tightened in an adjusted position and released and still remain in said assembled condition.

An object of my invention is to keep the strap ends continuously assembled, so that when not in use, there will not be any protruding parts or ends adapted to be caught by other objects which would tend to injure both the strap ends and the other objects, and being in this continuously assembled condition if desired, around an object to be enclosed, safer from liability against loss than if the ends were separated and removed.

A further object of my invention is to provide such a strap, having a neater appearance than other straps of this description which may, as shown in embodiments of my invention, present no holes on the exterior surfaces thereof either in assembled or disassembled position and if desired merely a pleasing cross bar or no cross bar.

A further object of another embodiment of my invention is to provide a strap which looks like an ordinary strap or belt when attached, but in which it is impossible to completely separate the ends thereof from their assembled position.

While my invention may be employed on a strap adapted to encircle any human limb or body torso or even to join two article portions, such as the top of an overshoe or garment, together, my invention is particularly adapted for use with straps for wrist watch bracelets. In this art, while many people have attempted to use expansible strap portions made of metal or otherwise, so far as I am aware no one has hitherto provided an expansible, attractive, flexible fabric strap. It is decidedly advantageous that the strap be not completely loosened and have its ends separated until the watch is entirely free from the wrist, and as there is normally only one hand to attach or release the wrist watch strap to or from the other hand, there is always the liability of the watch dropping as the wrist watch strap is attached or released and for this reason many types of extensible metal connectors have been provided.

A further object of my invention, therefore, is to provide a wrist watch strap which will look like an ordinary flexible fabric strap, but which has the advantages of the metallic, extensible members to prevent the wrist watch from falling away from the wrist while it is being attached or detached. While I am aware that others have attempted to connect strap ends together for this

2 purpose by separate connecting means, this connecting means has been in the way of the proper connection of the strap ends in use and a further object of my invention, therefore, is to provide a strap in which the portions which retain the strap together are portions of a normal buckle and the strap itself.

Further features of my invention relate to the specific structure of the strap ends and standard type of buckle employed therewith.

These and such other objects of my invention as may hereinafter appear will be best understood from a description of the accompanying drawings which illustrate various embodiments thereof.

In the drawings,

Fig. 10 is a rear perspective view of another embodiment of strap having a wrist watch interposed therein, constructed in accordance with my invention in attaching position.

Fig. 11 is a reverse plan view of the embodiment shown in Fig. 10 in attached position.

Fig. 12 is a vertical longitudinal sectional view taken along the line 12—12 of Fig. 11.

Fig. 13 is a disassembled perspective view of the parts of the buckle I preferably employ in this embodiment.

Figure 1:
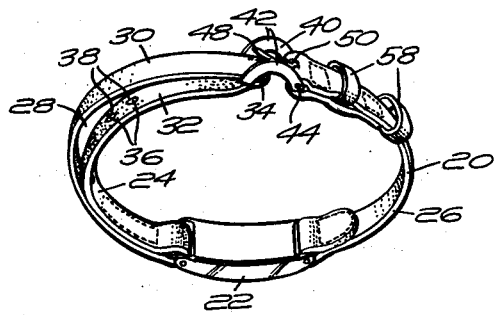
Fig. 1 is a rear perspective view of one embodiment of strap, having a wrist watch interposed therein, constructed in accordance with my invention, in released position.

Fig. 14 is an enlarged detailed perspective view of the position the parts of the strap of the embodiment of my invention shown in Figs. 10–13 taken as the strap end is being pulled through the buckle, illustrating in dotted lines how the buckle tongue may pivot downwardly through the slit center cross bar and through the longitudinal slit in the lower layer of the adjustable strap end, so that it may be inserted through a selected hole in the upper layer and pulled in position by the expanding strap ends against the front cross bar.

In the drawings, wherein like characters of reference generally indicate like parts throughout, all embodiments of my invention shown comprise the continuously assembled, adjustable and releasable strap 20, 20', 20'', and 20''' constructed in accordance with my invention, of a length to encircle a limb or body torso, or join two article portions together. Said strap is preferably constructed of freely flexible material such as leather or fabric, although it may be constructed of flexible metal as in the embodiment 20'' shown in Fig. 9. While it may be used to encircle the body torso, an arm or a leg or to join two article portions such as the portions of a garment, harness or otherwise together, I have shown it in the drawings as particularly adapted for use as a wrist watch bracelet strap, having the wrist watch 22 interposed in a standard manner centrally of the top portion thereof when in position on the wrist, providing an adjustable strap end 24, 24', 24'' or 24''' attached to one end of the wrist watch and a fixed strap end 26, 26' 26'' or 26''' attached to the opposite end of the wrist watch 22, although insofar as this invention is concerned, while particularly adapted for use with wrist watches to prevent them from dropping off while being attached or detached, it may be used in any type of a flexible strap for any purpose or on disconnected strap ends separately attached to different portions of an article or articles. The adjustable strap end 24, 24', 24'' or 24''' is transversely slit for a substantial distance longitudinally thereof into the transverse slit 28, 28', 28'' or 28''' for a substantial distance longitudinally thereof into two superimposed layers, namely, an upper layer 30, 30', 30'' or 30''' and a lower layer 32, 32', 32'' or 32''' terminating in a joined tip 34, 34', 34'' or 34'''. One of said layers has a series 36, 36', 36'' or 36''' of longitudinally spaced adjusting holes 38, 38', 38'' or 38''' therein. In the embodiments shown in Figs. 1–4 and 5–9, said series 36, 36', 36'' of holes 38, 38' or 38'' are in the lower layer 32, 32' or 32'', whereas in the embodiment shown in Figs. 10–14, said series 36''' of aligned holes 38''' is in the upper layer 30'''.

I also provide a standard type of buckle 40, 40', 40'' or 40''' on the end of the fixed strap end 26, 26', 26'' or 26'''. In all embodiments, said buckle has the side bars 42, 42', 42'' or 42''' and the preferably detachable rear bar 44, 44', 44'' or 44''' adapted to have the opposite or fixed strap end 26, 26', 26'' or 26''' attached thereto in any suitable manner such as shown by having the tip of the strap wound around it and sewn thereto, and a forward cross bar 46, 46', 46'' or 46''' permanently retained in use in said transverse slit by said tip 34, 34', 34'' or 34''', said rear bar being preferably removable for adjustment and release longitudinally rearwardly thereof. Said rear bar 44, 44', 44'' or 44''' has a forwardly extending tongue 48, 48', 48'' or 48''' as usual mounted thereon, if desired, the strap being cut away as at 50, 50', 50'' or 50''' for this purpose to pivote upwardly to be inserted through a selected hole 38, 38', 38'' or 38''' in said adjustable strap end 24, 24', 24'' or 24''' and downwardly in adjusted position against said forward bar 46, 46', 46'' or 46'''.

Figure 6:
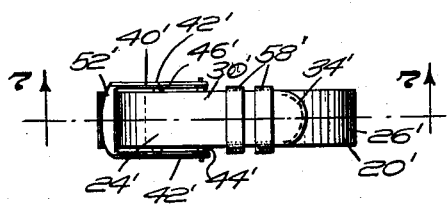
Fig. 6 is a reverse plan view of the embodiment shown in Fig. 5 in attached position.
Figure 7:
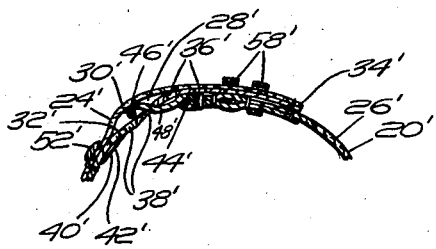
Fig. 7 is a vertical longitudinal sectional view taken along the line 7—7 of Fig. 6.
Figure 8:
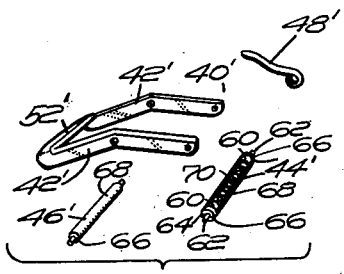
Fig. 8 is a disassembled perspective view of the parts of the buckle I preferably employ in this embodiment.
Figure 9:
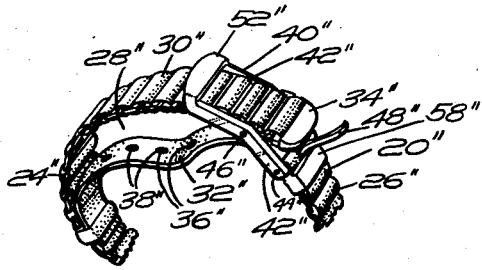
Fig. 9 is a rear perspective view of a modified form of the embodiment of my invention shown in Figs. 5–8, employing a flexible metal strap, in released position.

In the embodiment shown in Figs. 1–4, the forward cross bar 46 comprises the front bar of the buckle 40. In the embodiments shown in Figs. 5–9, the forward bar comprises the preferably detachable center cross bar 46' or 46''. In the embodiments shown in Figs. 5–14, an extra cross bar 52', 52'' or 52''' is interposed in front of the center cross bar 46', 46'' or 46''', so that the device may function as the embidment shown in Figs. 1–4, but with the usual front cross bar 52', 52'' or 52''' overlying the connected strap 20', 20'' or 20''' as shown in Figs. 6, 9 and 11. In the embodiment shown in Figs. 10–14, the center cross bar 46''' centrally slit as at 54 is adapted to be permanently retained within the longitudinal slit 28''', but the tongue 48''' during attachment and detachment and adjustment is adapted to pivot downwardly through the slit 54 in said center cross bar 46''' and through a longitudinal slit 56 in said lower layer 32''' commensurate with the length of the series 36''' of holes 38''' formed in the upper layer 30''' of this embodiment for selective adjustment of the tip thereof in a selected hole 38''' and rest in use against the supplemental front cross bar 52''' shown therein, adapted to overlie the strap 20''', as usual.

If desired, the fixed strap end 26, 26', 26'' or 26''' may be provided with one or more keeper loops 58, 58', 58'' or 58''' to retain the tip 34, 34', 34'' or 34''' of the adjustable end 24, 24', 24'' or 24''' of the strap therein when in attached or detached position, rearwardly of said buckle rear cross bar 44, 44', 44'' or 44'''.

Thus, the embodiment shown in Figs. 1–4 has two cross bars only, namely, the rear cross bar 44 and the forward cross bar 46, which in use is always entirely concealed within the transverse slit 28 to provide the absolutely smooth surface apart from the keeper fingers 58 on the outer surface of the adjustable strap end. This same feature is present in the embodiment shown in Figs. 5–9, but as in these embodiments the buckle is provided with the supplemental front cross bar 52' or 52'', it is apparent as shown in Figs. 6 and 9, that this superimposed front cross bar 52' or 52'' will lie on top of the strap to provide an effect similar to the usual effect, with the exception that the holes, while present in the strap end 24' or 24'', are not observable from the exterior thereof as they are in the lower layer 32' or 32'' and not in the upper layer 30' or 30''.

The embodiment shown in Figs. 10–14 looks in use just like an ordinary belt or strap, but due to the fact that the center cross bar 46''' slides in the transverse slit 28''', it prevents the buckle 40''' and fixed strap end 26''' from becoming disconnected from the free strap end 24''' by the tip 34''' contacting the cross bar 46'''.

Figure 4:
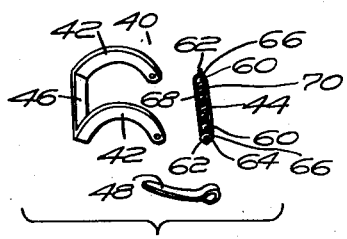
Fig. 4 is a disassembled perspective view of the parts of the buckle I preferably employ with this embodiment.
Figure 5:
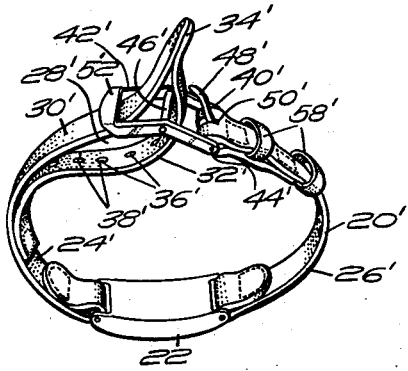
Fig. 5 is a rear perspective view of another embodiment of strap, having a wrist watch interposed therein, constructed in accordance with my invention in attaching position.

If desired, as shown in Fig. 4, the side walls 42 of the buckle may be arcuately bent forwardly or they may comprise the usual flat or slightly curved formation as shown in the other embodiments.

I have shown in the drawings, a rear cross bar 44, 44', 44'' or 44''' which is preferably detachable to aid in the assembling of the device. The center cross bar 46' in the embodiment shown in Figs. 5–9 may also be made detachable. The structure of the detachable cross bars 44, 44', 44'' or 44''' or 46' or 46'' is well known in the art and comprises the hollow tubes 58, the hubs 60, having pintles 62 projecting outwardly through holes 64 centrally of the closed outer ends 66 of said hollow tubes 68, said hubs 60 being freely slidable axially of said tubes 68 and being normally separated from each other by the expansion springs 70 contained within the tubes. It is apparent that these pins may be removed at will from their aligned holes in the side bars, particularly the forward cross pin 46' in the embodiment shown in Figs. 5-9 for detachment of the adjustable end 24 of the strap from the buckle 40, or if desired one end of the lower layer may be detachably secured to the upper layer by any suitable means for this purpose.

Figure 2:
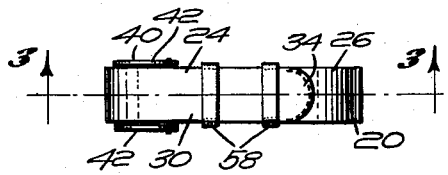
Fig. 2 is a reverse plan view thereof in attached position.
Figure 3:
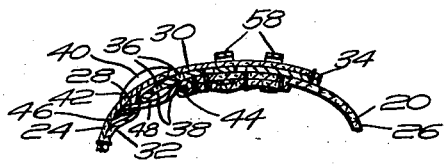
Fig. 3 is a vertical longitudinal sectional view taken along the line 3—3 of Fig. 2.

When attaching the strap, it may first be stretched to its full extent as shown in Fig. 1, by bringing the forward cross bar 46 so that it abuts the tip 34 of the adjustable strap end 24 and lie in the extreme outer end of the transverse slit 28, being in a maximum extensible position. When the wrist watch strap is thus inserted on the wrist, the tip 34 may be lifted upwards and pulled backwards until the tongue 48 fits in a selected adjusting hole 38 in the lower layer 32 with the tip of the tongue 48 resting against the forward cross bar 46, comprising the front cross bar 46 or 52''' as shown in the embodiment shown in Figs. 1-4 and Figs. 10-14 and the center cross bar 46' in the embodiment shown in Figs. 5-10, when the tip 34 of the strap end 24 may be inserted underneath the keeper loops 58 as shown in Figs. 2 and 3. In the embodiment shown in Figs. 10-14, the tongue 48''' may pivot upwardly through the central slit 54 of the center cross bar 46''' and slide in the longitudinal slit 56 until it is pivoted downwardly to be inserted in the proper selected hole 38''', in the manner indicated in Fig. 14.

The transverse slit 28, 28', 28'' or 28''' may be cut in the fabric or may be formed by the addition of a supplemental lower layer 32, 32', 32'' or 32''', having the ends thereof stitched or otherwise secured to the upper layer 30, 30', 30'' or 30''' of the strap end 24, 24', 24'' or 24''', which is particularly true in the embodiment shown in Fig. 9 where the outer layer 30' comprises a flexible metal fabric.

It is apparent that I have provided a novel type of continuously assembled adjustable and releasable strap adapted for the various uses and with the various advantages set forth above.

It is understood that my invention is not limited to the specific embodiments shown and that various deviations may be made therefrom without departing from the spirit and scope of the appended claims.

What I claim is:

1. A continuously assembled adjustable and releasable strap, comprising a flexible strap of a length to encircle a limb or body torso or join two article portions together, having an adjustable end transversely slit for a substantial distance longitudinally thereof into superimposed layers terminating in a joined tip, one of said superimposed layers having a series of longitudinally spaced adjusting holes therein, and a buckle having side bars, a forward cross bar permanently retained in said transverse slit by said tip, movable for adjustment and release longitudinally thereof, and a detachable rear bar having the opposite strap end fixedly secured thereto and having a forwardly extending tongue mounted thereon to pivot upwardly to be inserted through a selected hole in said adjustable strap end, and downwardly in adjusted position adjacent said forward bar, and a strap tip keeper means on said fixed strap end rearwardly of said buckle rear bar.

2. A continuously assembled adjustable and releasable strap, comprising a flexible strap of a length to encircle a limb or body torso or join two article portions together, having an adjustable end transversely slit for a substantial distance longitudinally thereof into superimposed layers terminating in a joined tip, one of said superimposed layers having a series of longitudinally spaced adjusting holes therein, and a buckle having side bars, a forward cross bar permanently retained in said transverse slit by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position adjacent said forward bar.

3. A continuously assembled adjustable and releasable strap, comprising a flexible strap of a length to encircle a limb or body torso or join two article portions together, having an adjustable end transversely slit for a substantial distance longitudinally thereof into superimposed layers terminating in a joined tip, said lower layer having a series of longitudinally spaced adjusting holes therein, and a buckle having side bars, a forward cross bar permanently retained in said transverse slit by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position against said forward bar.

4. A continuously assembled adjustable and releasable strap, comprising a flexible strap of a length to encircle a limb or body torso or join two article portions together, having an adjustable end transversely slit for a substantial distance longitudinally thereof into superimposed layers terminating in a joined tip, said lower layer having a series of longitudinally spaced adjusting holes therein, and a buckle having side bars, a front cross bar adapted to overlie said upper layer, a center cross bar permanently retained in said transverse slit by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position against said center cross bar.

5. A continuously assembled adjustable and releasable strap, comprising a flexible strap of a length to encircle a limb or body torso or join two article portions together, having an adjustable end transversely slit for a substantial distance longitudinally thereof into superimposed layers terminating in a joined tip, said upper layer having a series of longitudinally spaced adjusting holes therein and said lower layer having a longitudinal slit aligned with said series of holes throughout the length thereof, and a buckle having side bars, a front cross bar adapted to overlie said upper layer, a centrally split center cross bar permanently retained in said transverse slit by said tip, movable for adjustment and release longitudinally thereof, and a rear cross bar having the opposite strap end fixedly secured thereto and having a forwardly extending tongue mounted thereon to pivot upwardly to be inserted through a selected hole in said upper layer of said adjustable strap end through the split in said center bar and said slit in said lower layer and downwardly in adjusted position against said front cross bar.

6. An adjustable freely flexible strap end split for a substantial distance longitudinally thereof into two transversely separable upper and lower layers terminating in a joined tip forming a loop therein adjacent said tip, one of said layers having a series of longitudinal spaced adjusting holes therein.

7. An adjustable freely flexible strap end split for a substantial distance longitudinally thereof into two transversely separable upper and lower layers terminating in a joined tip forming a loop therein adjacent said tip, said lower layer having a series of longitudinal spaced adjusting holes therein.

8. An adjustable freely flexible strap end split for a substantial distance longitudinally thereof into two transversely separable upper and lower layers terminating in a joined tip forming a loop therein adjacent said tip, said upper layer having a series of longitudinal spaced adjusting holes therein, and said lower layer having a longitudinal slit aligned with said series of holes throughout the length thereof.

9. A continuously assembled adjustable and releasable strap, comprising a flexible strap of a length to encircle a limb or body torso or join two article portions together, having an adjustable end transversely slit for a substantial distance longitudinally thereof into superimposed layers terminating in a joined tip, said lower layer having a series of longitudinally spaced adjusting holes therein, and a buckle having side bars, a forward cross bar permanently retained in said transverse slit by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position against said forward bar, said buckle side bars having portions projecting outwardly therefrom to form trough walls to keep the belt ends in alignment.

10. A continuously assembled adjustable and releasable strap, comprising a flexible strap of a length to encircle a limb or body torso or join two article portions together, having an adjustable end slit for a substantial distance longitudinally thereof into transversely separable upper and lower portions terminating in a joined tip, one of said separable portions having a series of longitudinally spaced adjusting holes therein, and a buckle having side bars, a forward cross bar permanently retained in the space between said separable portions by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position adjacent said forward bar.

11. A continuously assembled adjustable and releasable strap, comprising a flexible strap of a length to encircle a limb or body torso or join two article portions together, having an adjustable end slit for a substantial distance longitudinally thereof into transversely separable upper and lower portions terminating in a joined tip, said lower portion having a series of longitudinally spaced adjusting holes therein, and a buckle having side bars, a forward cross bar permanently retained in the space between said separable portions by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position against said forward bar.

12. A continuously assembled adjustable and releasable strap, comprising a flexible strap of a length to encircle a limb or body torso or join two article portions together, having an adjustable end slit for a substantial distance longitudinally thereof into transversely separable upper and lower portions terminating in a joined tip, one of said separable portions having a series of longitudinally spaced adjusting holes therein, and a buckle having side bars, a front cross bar adapted to overlie said upper portion, a center cross bar permanently retained in the space between said separable portions by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position against said center cross bar.

13. A continuously assembled adjustable and releasable strap, comprising a flexible strap of a length to encircle a limb or body torso or join two article portions together, having an adjustable end slit for a substantial distance longitudinally thereof into transversely separable upper and lower portions terminating in a joined tip, one of said separable portions having a series of longitudinally spaced adjusting holes therein, and a buckle having side bars, a forward cross bar permanently retained in the space between said separable portions by said tip, movable for adjustment and release longitudinally thereof, and a rear bar having the opposite strap end fixedly secured thereto and having a forwardly extending tongue mounted thereon to pivot upwardly to be inserted through a selected hole in said adjustable strap end and downwardly in adjusted position against said forward bar, said buckle side bars having portions projecting outwardly therefrom to form trough walls to keep the belt ends in alignment.

CHARLES A. DOMLER.

REFERENCES CITED

The following references are of record in the file of this patent:

UNITED STATES PATENTS

| Number | Name | Date |
| --- | --- | --- |
| 774,853 | Smallman | Nov. 15, 1904 |
| 2,166,903 | Freysinger | July 18, 1939 |
| 2,168,521 | Greenberg | Aug. 8, 1939 |
| 2,215,195 | Ronci | Sept. 17, 1940 |
| 2,394,856 | Hickman | Feb. 12, 1946 |
| 2,420,435 | Lackow | May 13, 1947 |